(12) United States Patent
Farooq et al.

(10) Patent No.: US 10,703,320 B2
(45) Date of Patent: Jul. 7, 2020

(54) VEHICLE AIRBAG

(71) Applicant: Ford Global Technologies, LLC, Dearborn, MI (US)

(72) Inventors: S.M. Iskander Farooq, Novi, MI (US); Mohammad Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 148 days.

(21) Appl. No.: 15/944,170

(22) Filed: Apr. 3, 2018

(65) Prior Publication Data
US 2019/0299908 A1 Oct. 3, 2019

(51) Int. Cl.
*B60R 21/214* (2011.01)
*B60R 21/232* (2011.01)
*B60R 21/233* (2006.01)
*B60R 21/231* (2011.01)

(52) U.S. Cl.
CPC .......... *B60R 21/214* (2013.01); *B60R 21/232* (2013.01); *B60R 21/233* (2013.01); *B60R 2021/23153* (2013.01); *B60R 2021/23161* (2013.01); *B60R 2021/23308* (2013.01)

(58) Field of Classification Search
CPC ... B60R 21/214; B60R 21/233; B60R 21/232; B60R 2021/23161; B60R 2021/23153; B60R 2021/23308
See application file for complete search history.

(56) References Cited

U.S. PATENT DOCUMENTS

| | | | |
|---|---|---|---|
| 3,747,952 A * | 7/1973 | Graebe | B60R 21/205 280/730.1 |
| 3,801,126 A * | 4/1974 | Knight, IV | B60R 21/205 280/732 |
| 5,772,238 A | 6/1998 | Breed et al. | |
| 8,403,358 B2 * | 3/2013 | Choi | B60R 21/214 280/728.2 |
| 9,227,531 B2 | 1/2016 | Cuddihy et al. | |
| 9,725,064 B1 | 8/2017 | Faruque et al. | |
| 9,789,840 B2 | 10/2017 | Farooq et al. | |
| 2017/0113646 A1 * | 4/2017 | Lee | B60R 21/2338 |
| 2017/0361800 A1 * | 12/2017 | Ohachi | B60R 21/231 |
| 2017/0361802 A1 | 12/2017 | Farooq et al. | |
| 2018/0043852 A1 * | 2/2018 | Fischer | B60R 21/231 |
| 2019/0106073 A1 * | 4/2019 | Sundararajan | B60R 21/214 |
| 2019/0217804 A1 * | 7/2019 | Cho | B60R 21/0136 |
| 2019/0241145 A1 * | 8/2019 | Hiruta | B60R 21/2338 |
| 2019/0241148 A1 * | 8/2019 | Shin | B60R 21/232 |

FOREIGN PATENT DOCUMENTS

JP 201688413 A 5/2016

* cited by examiner

*Primary Examiner* — Drew J Brown
(74) *Attorney, Agent, or Firm* — Frank A. MacKenzie; Bejin Bieneman PLC

(57) ABSTRACT

A vehicle includes a roof and a first member supported by the roof. The first member is inflatable to an inflated position. The vehicle includes a second member supported by and in fluid communication with the first member and inflatable to an inflated position elongated along a vehicle-lateral axis and spaced from the roof. The vehicle includes an uninflatable panel extending from the roof and fixed to the second member in the inflated position.

18 Claims, 8 Drawing Sheets

VEHICLE AIRBAG

BACKGROUND

A vehicle may include one or more airbags deployable during vehicle impacts to absorb energy from occupants of the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
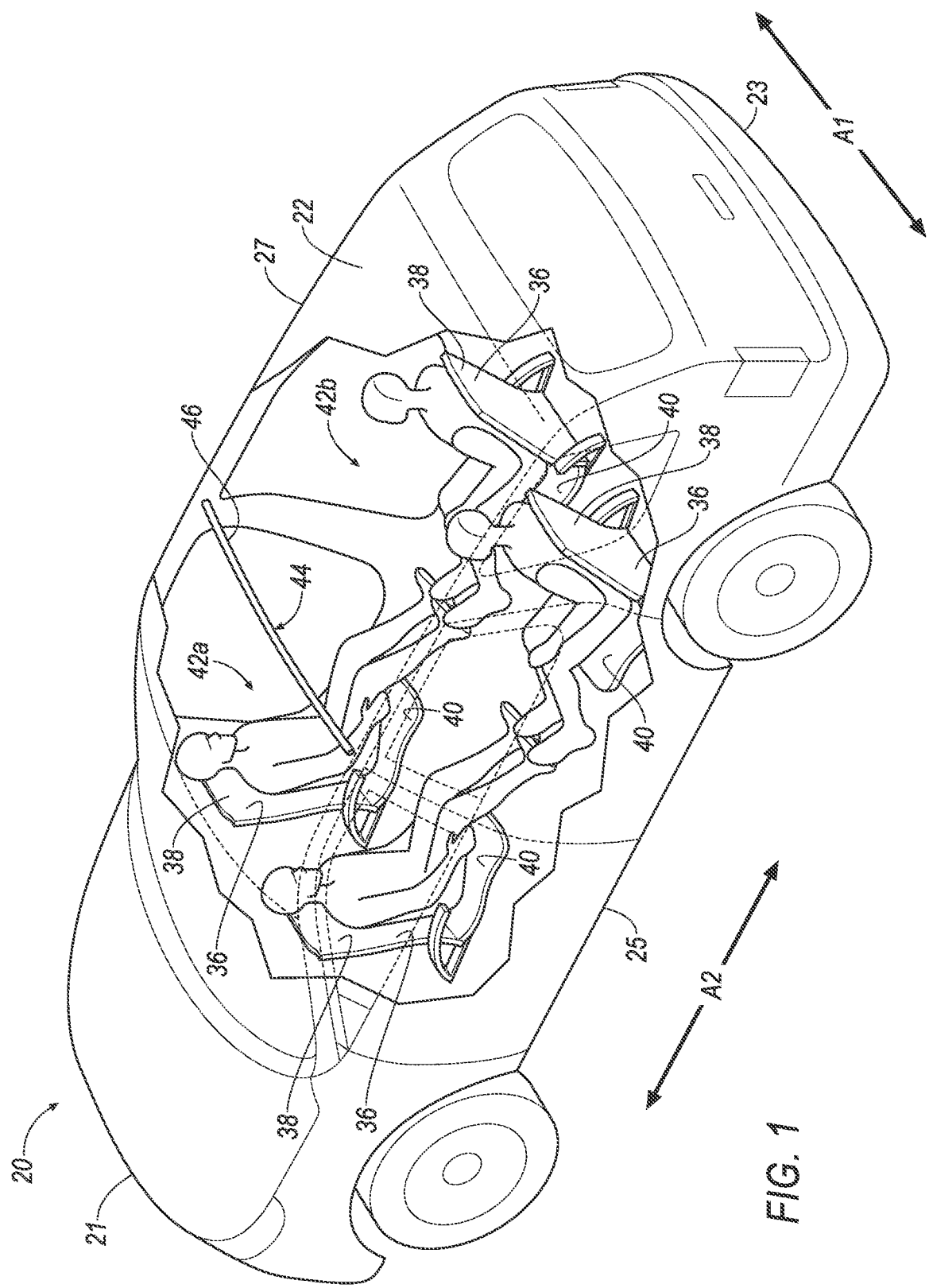
FIG. 1 is a perspective view of a vehicle with an airbag in an uninflated position.

A vehicle includes a roof and a first member supported by the roof. The first member is inflatable to an inflated position. The vehicle includes a second member supported by and in fluid communication with the first member and inflatable to an inflated position elongated along a vehicle-lateral axis and spaced from the roof. The vehicle includes an uninflatable panel extending from the roof and fixed to the second member in the inflated position.

The second member in the inflated position may be tubular.

The second member in the inflated position may include an outer panel defining a depression.

The depression may extend around the second member relative to the vehicle-lateral axis.

The vehicle may include a first seat and a second seat facing each other and the depression when the second member is in the inflated position.

The second member may define a chamber and may include a tether in the chamber extending from the outer panel at the depression.

The outer panel of the second member in the inflated position may define a second depression spaced from the depression along the vehicle-lateral axis.

The vehicle may include a first seat and a second seat arranged along the vehicle-lateral axis, the first seat facing the depression and the second seat facing the second depression.

The second member may include an outer panel and a plurality of tubes extending from the outer panel.

The vehicle may include a third member supported by the roof and inflatable to an inflated position spaced from the first member and supporting the second member.

An airbag assembly includes a tubular member defining an axis and including a first, a second, and a third guide spaced from each other along the axis, each guide extending circumferentially around the axis. The airbag assembly includes a first depression between the first and the second guides, and extending circumferentially around the axis radially inward relative to the first and the second guides. The airbag assembly includes a second depression between the second and the third guides, and extending circumferentially around the axis radially inward relative to the second and the third guides.

The airbag assembly may include a housing and an uninflatable panel extending from the housing and fixed to the tubular member.

The tubular member may include a passage extending along the axis.

The first guide may include a plurality of tubes elongated transverse to the axis.

The plurality of tubes may be elongated radially relative to the axis.

The first guide may be continuous around the axis.

The airbag assembly may include an outer panel arcuately extending along the first guide, the first depression, and the second guide.

The tubular member may be oblong in cross section perpendicular to the axis.

With reference to the Figures, wherein like numerals indicate like parts throughout the several views, a vehicle 20 includes a roof 22 and a first member 24 supported by the roof 22 and inflatable to an inflated position. The vehicle 20 includes a second member 26 supported by and in fluid communication with the first member 24 and inflatable to an inflated position elongated along a vehicle-lateral axis A1 and spaced from the roof 22. The vehicle 20 includes an uninflatable panel 28 extending from the roof 22 and fixed to the second member 26 in the inflated position. The uninflatable panel 28 supports the second member 26 in the inflated position such that second member 26 in the inflated position may control kinematics of occupants inside the vehicle 20, e.g., seated next to each other along the vehicle-lateral axis A1, during a vehicle impact. The adjectives "first" and "second" are used throughout this document as identifiers and are not intended to signify importance or order.

The vehicle 20 may be any passenger or commercial automobile such as a car, a truck, a sport utility vehicle, a crossover vehicle, a van, a minivan, a taxi, a bus, etc.

The vehicle 20 defines the vehicle-lateral axis A1, i.e., extending between a left side 25 and a right side 27 of the vehicle 20. The vehicle 20 defines a vehicle-longitudinal axis A2, i.e., extending between a front 21 and a rear 23 of the vehicle 20. The vehicle-lateral axis A1 and the vehicle-longitudinal axis A2 are perpendicular to each other. The front 21, rear 23, left side 25, and right side 27 may be relative to an orientation of an operator of the vehicle 20. The front 21, rear 23, left side 25, and right side 27 may be relative to an orientation of controls for operating the vehicle 20, e.g., an instrument panel, etc. The front 21, rear 23, left side 25, and right side 27 may be relative to a forward driving direction when wheels of the vehicle 20 are all parallel with each other.

Figure 2:
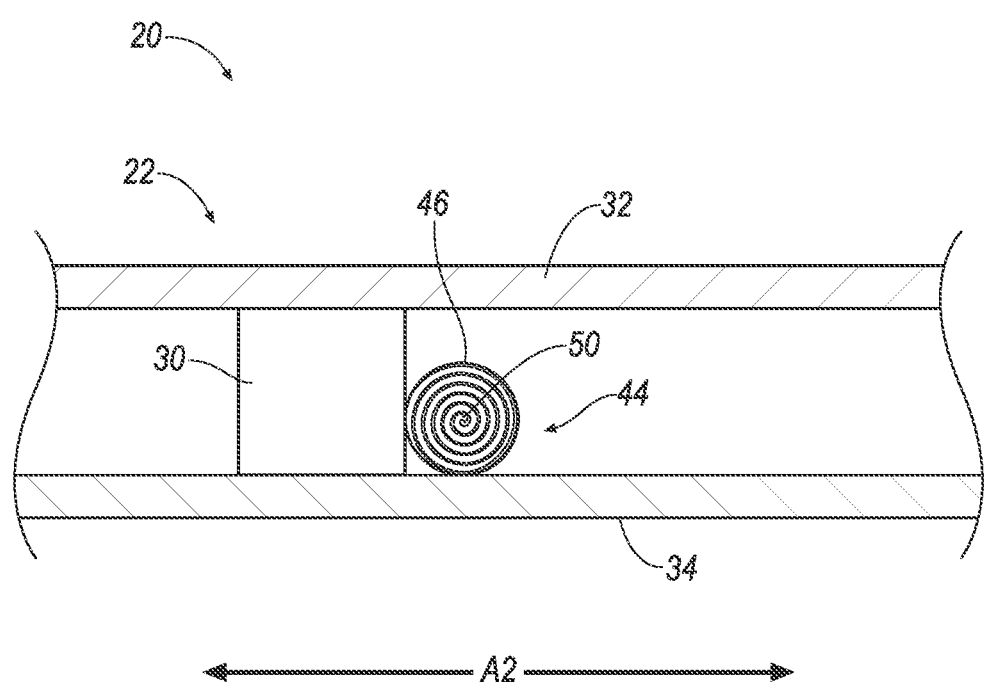
FIG. 2 is a cross section of a roof of the vehicle.
Figure 3:
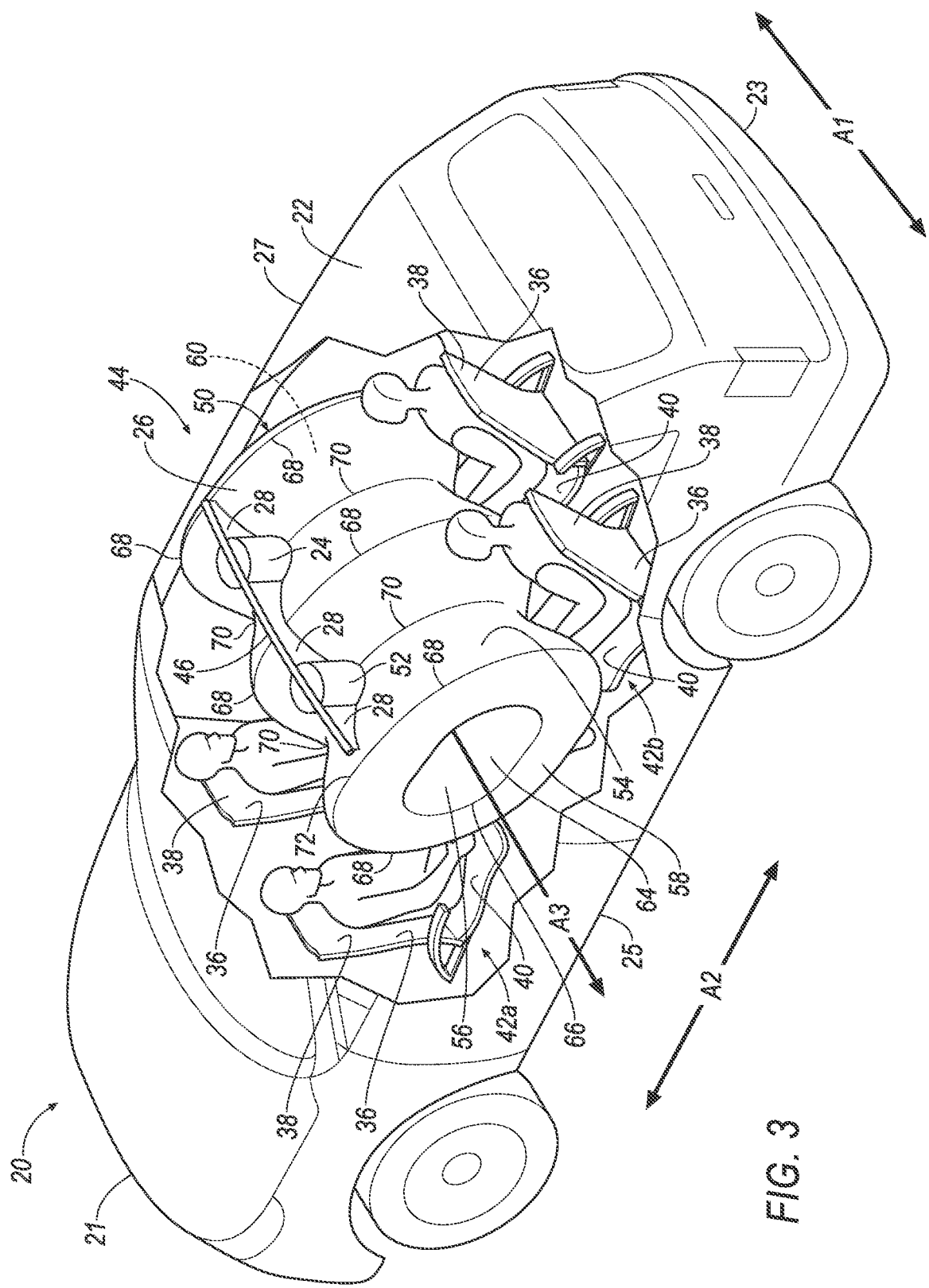
FIG. 3 is a perspective view of the vehicle with the airbag in an inflated position.
Figure 4:
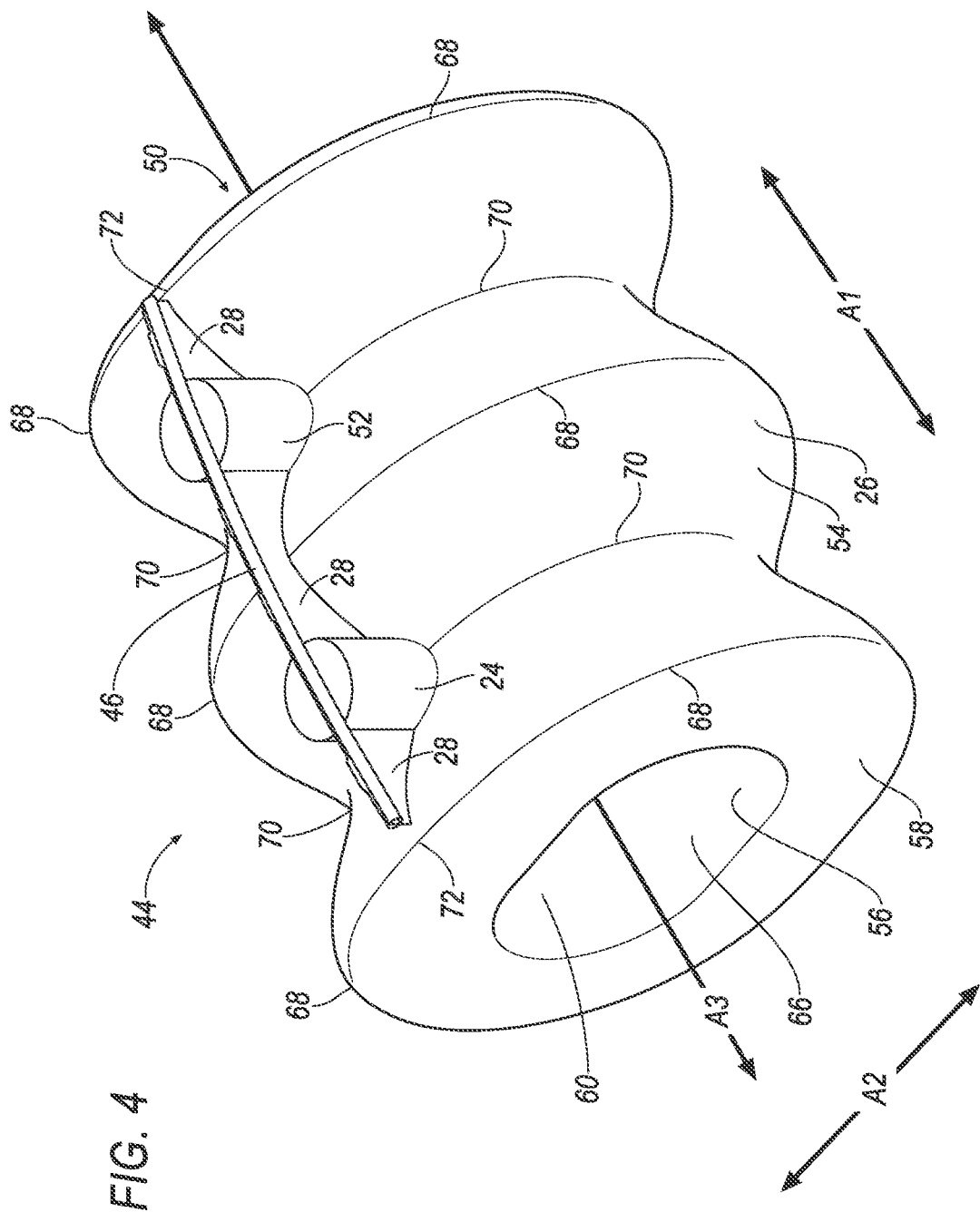
FIG. 4 is a perspective view of the airbag in the inflated position.
Figure 5:
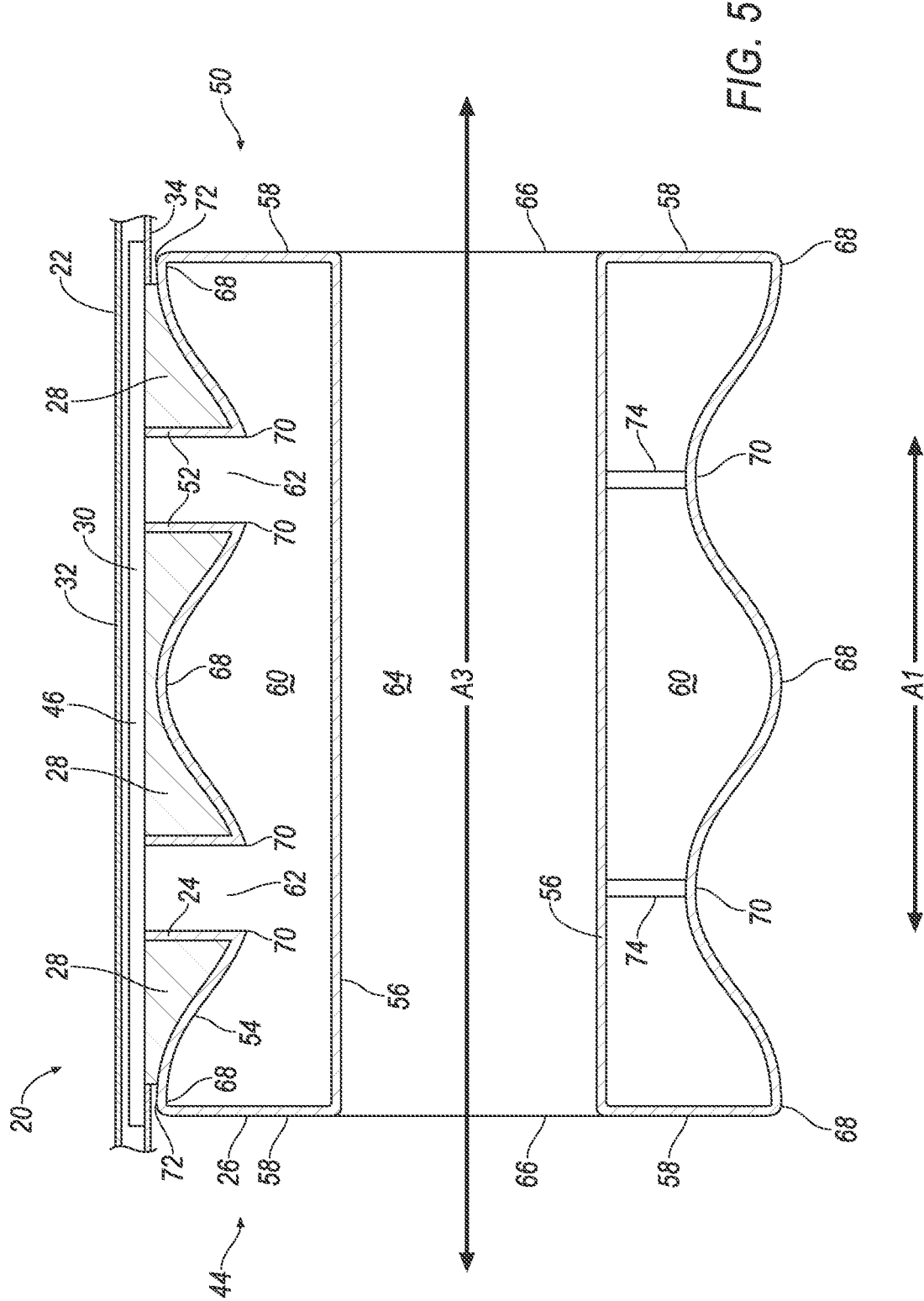
FIG. 5 is a cross section of the airbag in the inflated position.

The roof 22 provides cover for occupants for the vehicle 20. The roof 22 may include cross-beams 30, an exterior panel 32, and a headliner 34, shown in FIG. 2. The cross-beams 30 support the exterior panel 32, the headliner 34, etc. The cross-beams 30 may be steel, aluminum, carbon fiber, or any other suitable material. The cross-beams 30 may be elongated along the vehicle-lateral axis A1. The headliner 34 and the exterior panel 32 provide class-A surfaces to the roof 22, i.e., surfaces specifically manufactured to have a high-quality, finished aesthetic appearance free of blemishes, etc.

The headliner 34 may include a tear seam. The tear seam is designed to rupture upon inflation of the first member 24 and the second member 26. The tear seam may be weaker than a portion of the headliner 34 adjacent the tear seam, e.g., the tear seam may be thinner, a weaker material, etc. The tear seam may connect panels of the headliner 34, e.g., with breakaway stitches. The tear seam may extend along the vehicle-lateral axis A1.

The vehicle 20 includes one or more seats 36. The exemplary seats 36 are bucket seats, but alternatively the seats 36 may be a bench seat or another type of seat. The seats 36 may be supported by a floor of the vehicle 20.

Each seat 36 may include a seat back 38 and a seat bottom 40. The seat back 38 may be supported by the seat bottom 40 and may be stationary or movable relative to the seat bottom 40.

The seats 36 may be arranged in rows 42a, 42b. For example, seats 36 in one of the rows 42a, 42b may be arranged along the vehicle-lateral axis A1 at a common distance from the front 21 of the vehicle 20. The seats 36 may be arranged in multiple rows 42a, 42b, e.g., a first row 42a, a second row 42b, etc. The first row 42a may be in front of the second row 42b. To put it another way, the first row 42a may be between the second row 42b and the front 21 of the vehicle 20.

The seats 36 may face each other. For example, seats 36 of the first row 42a may face the seats 36 of the second row 42b, and vice versa. To put it another way, the seat bottoms 40 of the seats 36 of the first row 42a may be between the seat backs 38 of the seats 36 of the first row 42a and the seats 36 of the second row 42b, and the seat bottoms 40 of the seats 36 of the second row 42b may be between the seat backs 38 of the seats 36 of the second row 42b and the seats 36 of the first row 42a.

The vehicle 20 includes an airbag assembly 44. The airbag assembly 44 may include a housing 46, an inflator 48, and an airbag 50. The airbag 50 includes the first member 24 and the second member 26. The airbag 50 is inflatable from an uninflated position to an inflated position, e.g., the first member 24 and the second member 26 are inflatable to the inflated positions. The inflator 48 and the airbag 50 may be disposed in the housing 46 in the uninflated position. The housing 46 provides a reaction surface for the airbag 50 in the inflated position, shown in FIGS. 3-7. The housing 46 may be supported by the roof 22 or at any other suitable location of the vehicle 20. For example, the housing 46 may be fixed to one or more of the cross-beams 30. The housing 46 may be any material, e.g., a rigid polymer, a metal, a composite, etc.

The airbag 50 may be a woven polymer or any other material. As one example, the airbag 50 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first member 24 supports the second member 26 and directs fluid to the second member 26. The first member 24 is supported by the roof 22. For example, the first member 24 may be fixed to the housing 46 supported by the roof 22. The first member 24 in the inflated position may extend downwardly from the roof 22. The first member 24 is designed to transmit the inflation medium from the inflator 48 to the second member 26, e.g., the first member 24 may be tubular. The first member 24 may be cylindrical in the inflated position, or any suitable shape.

The airbag 50 may include a third member 52. The third member 52 is inflatable to an inflated position. The third member 52 supports the second member 26 and directs fluid to the second member 26. The third member 52 may be supported by the roof 22. For example, the third member 52 may be fixed to the housing 46 supported by the roof 22. The third member 52 in the inflated position may extend downwardly from the roof 22. The third member 52 may be cylindrical in the inflated position, or any suitable shape. The third member 52 may be spaced from the first member 24, e.g., along the vehicle-lateral axis A1.

The second member 26 in the inflated position restricts movement of occupants of the vehicle 20 during a vehicle impact. The second member 26 may include an outer panel 54, an inner panel 56, and side panels 58. The side panels 58 may extend from the outer panel 54 to the inner panel 56. The outer panel 54, the inner panel 56, and/or the side panels 58 may be fixed to each other, e.g., via stitching, friction welding, adhesive, etc. The outer panel 54, the inner panel 56, and/or the side panels 58 may be monolithic, i.e., a one-piece construction, e.g., a same sheet of material.

The second member 26 defines a chamber 60. The chamber 60 may be between the outer panel 54, the inner panel 56, and the side panels 58. The chamber 60 receives fluid to inflate the second member 26 to the inflated position.

The second member 26 is supported by the first member 24, and may be supported by the third member 52. For example, the first member 24 and the third member 52 may be fixed to the outer panel 54 of the second member 26, e.g., via stitching, friction welding, adhesive, etc. As another example, the first member 24 and the third member 52 may be may be monolithic, e.g., a same sheet of material.

The second member 26 is in fluid communication with the first member 24, and may be in fluid communication with the third member 52. For example, the airbag 50 may define openings 62 between the first member 24 and the second member 26, and between the third member 52 and the second member 26. Fluid may flow from the first member 24 and the third member 52 through the openings 62 into the chamber 60 of the second member 26.

The second member 26 in the inflated position is spaced from the roof 22. For example, the first member 24 and the third member 52 may be between the roof 22 and the second member 26. Similarly, the second member 26 in the inflated position is spaced from the housing 46.

The second member 26 in the inflated position may be tubular and define an axis A3. For example, the outer panel 54 of second member 26 in the inflated position may be a circle or an oval extruded along the axis A3. To put it another way, the second member 26 may be oblong in cross section perpendicular to the axis A3 and may be elongated along the axis A3. The second member 26 in the inflated position may be elongated along the vehicle-lateral axis A1. For example, the axis A3 may be parallel to the vehicle-lateral axis A1.

The second member 26 may include a passage 64. The passage 64 reduces a volume of fluid required to inflate the second member 26. The passage 64 may extend along the axis A3, e.g., between opposing open ends 66. The passage 64 may be defined by the inner panel 56.

The second member 26 includes a plurality of guides 68, 168. The guides 68, 168 direct movement of an occupant of the vehicle 20 during an impact to the vehicle 20, e.g., such that the occupant is directed to move between two of the guides 68, 168, e.g., toward a depression 70, 170 (discussed below). The guides 68, 168 are spaced from each other along the axis A3. Each guide 68, 168 may extend circumferentially around the axis A3. To put it another way, each guide

68, 168 may extend along the circular or oval shape of the cross section of the outer panel 54.

The second member 26 includes a plurality of depressions 70, 170. Each depression 70, 170 is between a pair of the guides 68, 168, e.g., two of the guides 68, 168 may be opposite each other relative to one of the depressions 70, 170. To put it another way, the guides 68, 168 and the depressions 70, 170 may be in an alternating arrangement, e.g., along the vehicle-lateral axis A1 and the axis A3.

The depressions 70, 170 extend around the second member 26 relative to the vehicle-lateral axis A1. For example, the depressions 70, 170 may extend circumferentially around the axis A3 radially inward relative to the first and the second guides 68, 168. To put it another way, each depression 70, 170 may extend along the circular or oval shape of the cross section of the outer panel 54, and may be closer to the axis A3 than the guides 68, 168.

The second member 26 in the inflated position may be positioned within the vehicle 20 to restrict movement of occupants of multiple seats 36, e.g., the seats 36 and the depressions 70, 170 may be arranged relative to the depressions 70, 170 along the vehicle-longitudinal axis A2. For example, the one of the seats 36 of the first row 42*a* and one of the seats 36 of the second row 42*b* may face each other with the second member 26 in the inflated position therebetween. Such seats 36 may face one of the depressions 70, 170. To put it another way, the one of the seats 36 of the first row 42*a* and one of the seats 36 of the second row 42*b* may face the same depression 70, 170 on opposite sides of the second member 26. As another example, one of the seats 36 of the first row 42*a* may face one of the depressions 70, 170, and another of the seats 36 of the first row 42*a* may face another of the depressions 70, 170. To put it another way, the seats 36 of the first row 42*a* may face the depressions 70, 170, with each seat 36 facing its own depression 70, 170. Similarly, one of the seats 36 of the second row 42*b* may face one of the depressions 70, 170, and another of the seats 36 of the second row 42*b* may face another of the depressions 70, 170.

The airbag 50 may include one or more uninflatable panels 28. The uninflatable panels 28 support the second member 26 in the inflated position. The uninflatable panels 28 may extend from the roof 22, e.g., the uninflatable panels 28 may be fixed to the housing 46. The uninflatable panels 28 may be fixed to the second member 26, e.g., fixed to the outer panel 54 along a length of the second member 26 and parallel to the axis A3. One of the uninflatable panels 28 may extend between the first member 24 and the third member 52. One of the uninflatable panels 28 may extend from the first member 24 toward a distal end 72 of the second member 26. One of the uninflatable panels 28 may extend from the third member 52 toward another distal end 72 of the second member 26.

The uninflatable panels 28 are separated from the chamber 60 and are not inflated with inflation medium when the airbag 50 is in the inflated position. The uninflatable panels 28 do not include a chamber inflatable by the inflation medium.

With reference to the embodiment shown in FIGS. 2-5, the guides 68 may be continuous around the axis A3. For example, the guides 68 may extend without interruption along the circular or oval shape of the cross section of the outer panel 54. As another example, the guides 68 may extend from the first member 24 or the third member 52 along the circular or oval shape of the cross section of the outer panel 54 (not shown).

The outer panel 54 may define the guides 68 and the depressions 70. For example, the outer panel 54 may arcuately extend, e.g., in a wave pattern between the distal ends 72 of the second member 26, along the guides 68 and the depressions 70.

The second member 26 may include one or more tethers 74. The tethers 74 aid in positioning the outer panel 54 to define the guides 68 and the depressions 70. The tethers 74 may be in the chamber 60 and extend from the outer panel 54 at the depressions 70. The tethers 74 may extend to the inner panel 56. The tethers 74 may be fixed to the outer panel 54 at the depressions 70 and fixed to the inner panel 56, e.g., via stitching, friction welding, adhesive, etc.

Figure 6:
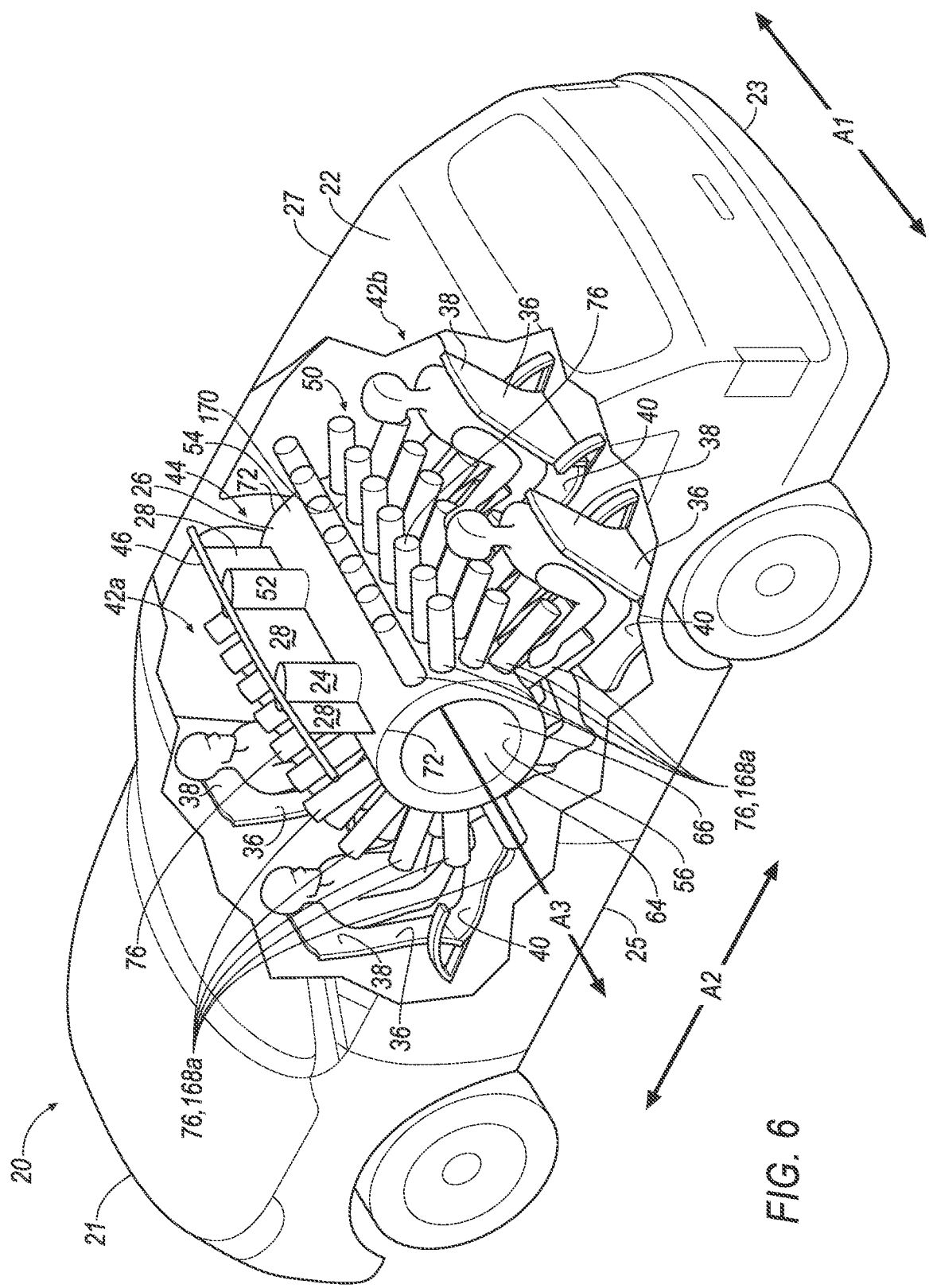
FIG. 6 is a perspective view of the vehicle with another airbag in an inflated position.
Figure 7:
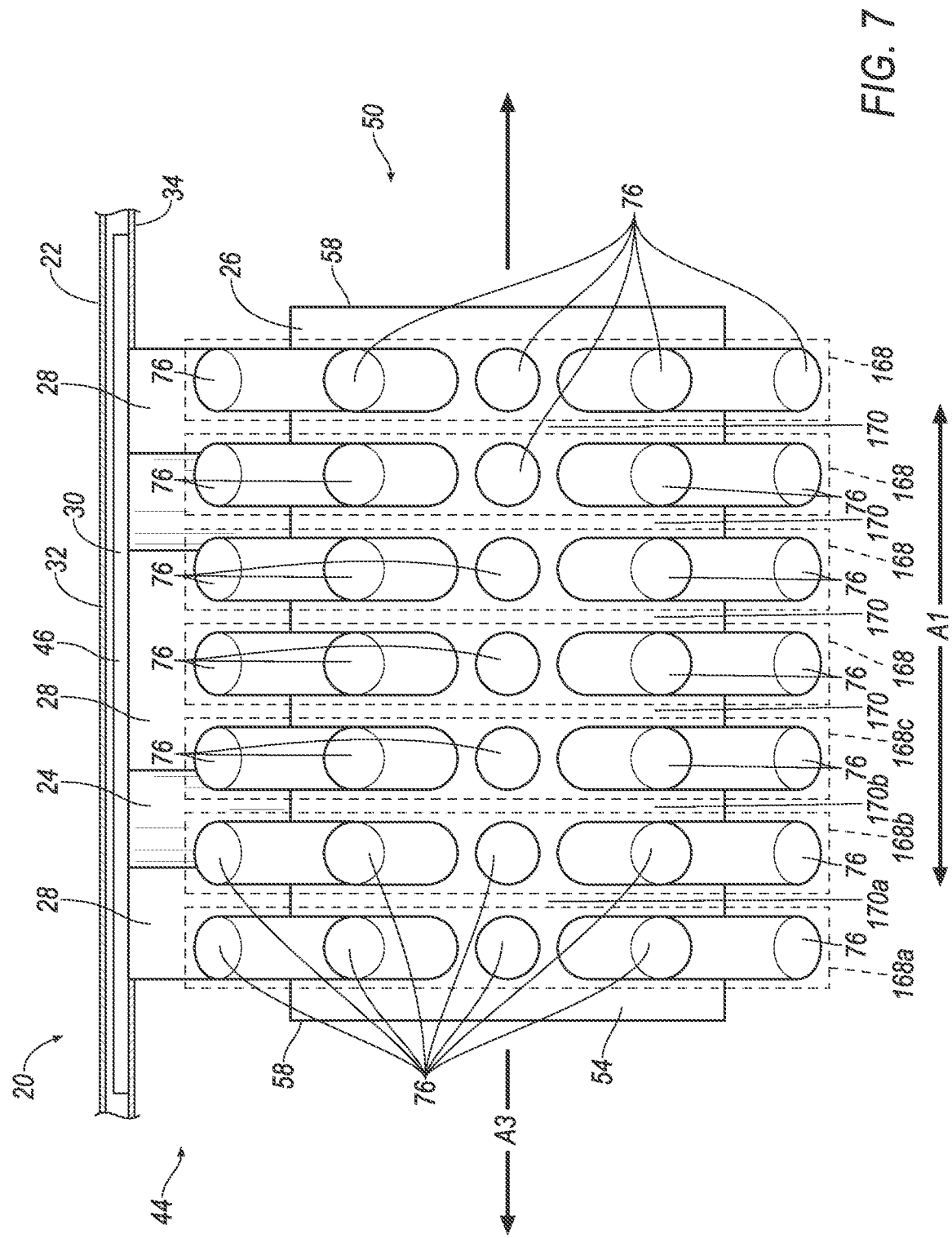
FIG. 7 is a front view of the airbag of FIG. 6 in the inflated position.

With reference to the embodiment shown in FIGS. 6 and 7, the guides 168 (shown in FIG. 7) may each include a plurality of tubes 76 extending from the outer panel 54. Each guide 168 may include tubes 76 arranged in a ring circumferentially around the axis A3. For example, some of the tubes 76 may collectively provide a first guide 168*a* (shown in FIGS. 6 and 7), others of the tubes 76 may collectively provide a second guide 168*b* (shown in FIG. 7), other of the tubes 76 may collectively provide a third guide 168*c*, etc. (shown in FIG. 7). The plurality of tubes 76 may be elongated transverse to the axis A3. The plurality of tubes 76 may be elongated radially relative to the axis A3, e.g., the tubes 76 may extend radially from the outer panel 54. The tubes 76 may be spaced from each other and/or may contact each other along each ring. To put it another way, tubes 76 of the first guide 168*a* may be spaced from each other and/or may contact each other. Tubes 76 arranged in a ring may be may be spaced along the axis A3 from tubes 76 arranged in another ring, e.g., with the depression 170 therebetween (shown in FIG. 7). For example, tubes 76 providing the first guide 168*a* may be spaced from tubes 76 providing the second guide 168*b* along the axis A3 with a first depression 170*a* between the first guide 168*a* and the second guide 168*b*, and tubes 76 providing the second guide 168*b* may be spaced from tubes 76 providing the third guide 168*c* along the axis A3 with a second depression 170*b* between the second guide 168*b* and the third guide 168*c*. It is to be understood that a rear view of the embodiment shown in FIGS. 6 and 7 could be identical to the front view shown in FIG. 7.

The tubes 76 control kinematics of an occupant during a vehicle impact to direct such occupant toward the one of the depressions 170. For example, tubes 76 of the first guide 168*a* and the second guide 168*b* may direct movement of the occupant toward the first depression 170*a*, and tubes 76 of the second guide 168*b* and the third guide 168*c* may direct movement of the occupant toward the second depression 170*b*.

Figure 8:
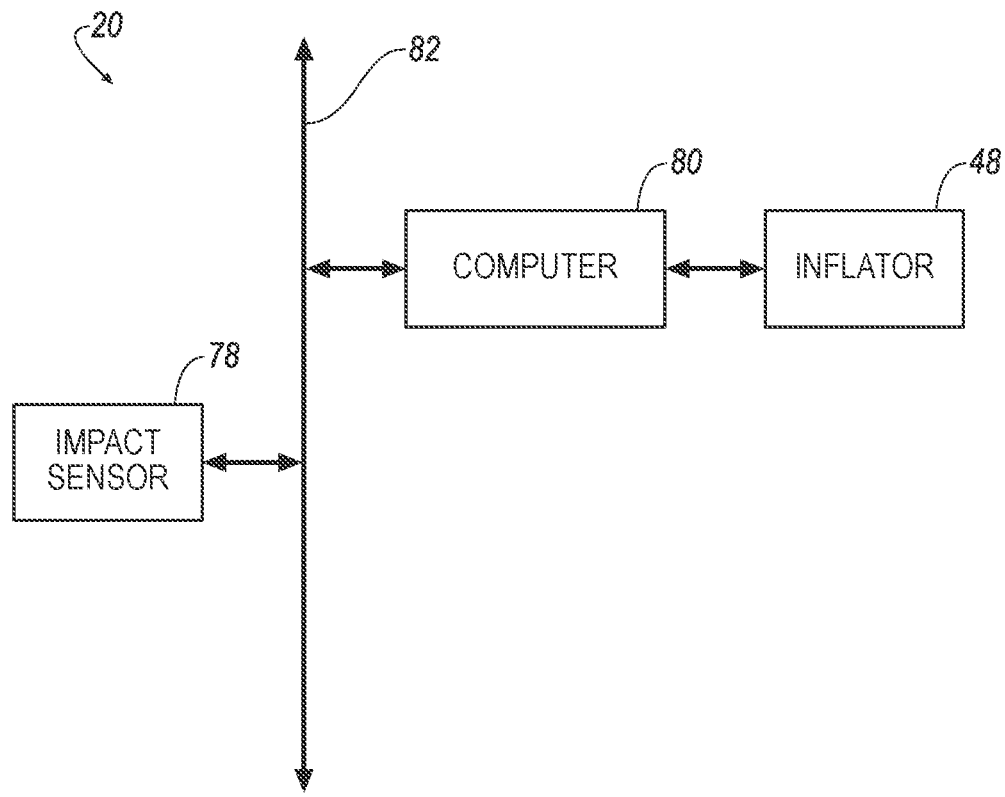
FIG. 8 is a block diagram of components of the vehicle.

With reference to FIG. 8, the vehicle 20 may include at least one impact sensor 78 for sensing impact of the vehicle 20, and a computer 80 in communication with the impact sensor 78 and the inflator 48. The impact sensor 78 is configured to detect an impact to the vehicle 20. Alternatively or additionally to sensing impact, the impact sensor 78 may be configured to sense impact prior to impact, i.e., preimpact sensing. The impact sensor 78 may be of any suitable type, for example, post contact sensors such as accelerometers, pressure sensors, and contact switches; and pre impact sensors such as radar, LIDAR, and vision sensing systems. The vision systems may include one or more cameras, CCD image sensors, CMOS image sensors, etc. The impact sensor 78 may be located at numerous points in or on the vehicle 20.

The inflator 48 provides inflation medium to inflate the airbag 50, e.g., to inflate the members 24, 26, 52 from the uninflated positions to the inflated positions. The inflator 48 may be, for example, a pyrotechnic inflator that uses a chemical reaction to drive inflation medium to the airbag 50. The inflator 48 may be of any suitable type, for example, a cold-gas inflator. The inflator 48 may be in fluid communication with the airbag 50, e.g., directly, through various piping, etc. The inflator 48 may be supported by the housing 46, the roof 22, or by any other suitable location of the vehicle 20. More than one inflator 48 may be used to inflate the airbag 50.

The computer 80 and the impact sensor 78 may be connected to a communication bus 82, such as a controller area network (CAN) bus, of the vehicle 20. The computer 80 may use information from the communication bus 82 to control the activation of the inflator 48. The inflator 48 may be connected directly to the computer 80, as shown in FIG. 8, or the inflator 48 may be connected via the communication bus 82.

The computer 80 may be a microprocessor based computer 80 implemented via circuits, chips, or other electronic components. For example, the computer 80 may include a processor, a memory, etc. The memory of the computer 80 may include memory for storing programming instructions executable by the processor as well as for electronically storing data and/or databases. The computer 80 may activate the inflator 48, e.g., provide an impulse to a pyrotechnic charge of the inflator 48 when the impact sensor 78 senses an impact of the vehicle 20. The computer 80 may store instructions executable by the processor to inflate the airbag 50 in response to detecting a vehicle impact. For example, upon detecting a vehicle impact based on information from the impact sensor 78 the computer 80 may instruct the inflator 48 to inflate the airbag 50.

In operation, the airbag 50 is in the uninflated position under normal operating conditions of the vehicle 20. In the event of an impact, the impact sensor 78 may detect the impact and transmit a signal through the communication bus 82 to the computer 80. The computer 80 may transmit a signal to the inflator 48. Upon receiving the signal, the inflator 48 may discharge and inflate the airbag 50 with inflation medium from the uninflated position to the inflated position.

During the impact, momentum of the occupant seated in one of the seats 36 may cause the occupant to move along the vehicle-longitudinal axis A2 toward the airbag 50 in the inflated position. The occupant may be directed by the guides 68, 168 to one of the depressions 70, 170 and movement of the occupant may be transferred to the airbag 50, e.g., restricting further movement of the occupant relative to the vehicle 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a roof;
   a first member supported by the roof and inflatable to an inflated position;
   a second member supported by and in fluid communication with the first member and inflatable to an inflated position elongated along a vehicle-lateral axis and spaced from the roof, the second member in the inflated position includes an outer panel defining a depression, and the second member defines a chamber and includes a tether in the chamber extending from the outer panel at the depression; and
   an uninflatable panel extending from the roof and fixed to the second member in the inflated position.

2. The vehicle of claim 1, wherein the second member in the inflated position is tubular.

3. The vehicle of claim 1, wherein the depression extends around the second member relative to the vehicle-lateral axis.

4. The vehicle of claim 3, further comprising a first seat and a second seat facing each other and the depression when the second member is in the inflated position.

5. The vehicle of claim 1, wherein the outer panel of the second member in the inflated position defines a second depression spaced from the depression along the vehicle-lateral axis.

6. The vehicle of claim 5, further comprising a first seat and a second seat arranged along the vehicle-lateral axis, the first seat facing the depression and the second seat facing the second depression.

7. The vehicle of claim 1, wherein the second member includes an outer panel and a plurality of tubes extending from the outer panel.

8. The vehicle of claim 1, further comprising a third member supported by the roof and inflatable to an inflated position spaced from the first member and supporting the second member.

9. An airbag assembly, comprising:
   a first seat;
   a second seat spaced from the first seat along a lateral axis;
   a tubular member including a first, a second, and a third guide spaced from each other along the lateral axis, each guide extending circumferentially around the lateral axis;
   a first depression between the first and the second guides, the first depression extending circumferentially around the lateral axis radially inward relative to the first and the second guides, the first depression centered relative to the first seat along the lateral axis; and
   a second depression between the second and the third guides, the second depression extending circumferentially around the lateral axis radially inward relative to the second and the third guides, the second depression centered relative to the second seat along the lateral axis.

10. The airbag assembly of claim 9, further comprising a housing and an uninflatable panel extending from the housing and fixed to the tubular member.

11. The airbag assembly of claim 9, wherein the tubular member includes a passage extending along the axis.

12. The airbag assembly of claim 9, wherein the first guide includes a plurality of tubes elongated transverse to the axis.

13. The airbag assembly of claim 12, wherein the plurality of tubes are elongated radially relative to the axis.

14. The airbag assembly of claim 9, wherein the first guide is continuous around the axis.

15. The airbag assembly of claim 9, further comprising an outer panel arcuately extending along the first guide, the first depression, and the second guide.

16. The airbag assembly of claim 9, wherein the tubular member is oblong in cross section perpendicular to the axis.

17. An airbag assembly, comprising:
- a tubular member defining an axis and including a first, a second, and a third guide spaced from each other along the axis, each guide extending circumferentially around the axis, the first guide including a plurality of tubes elongated transverse to the axis;
- a first depression between the first and the second guides, the first depression extending circumferentially around the axis radially inward relative to the first and the second guides; and
- a second depression between the second and the third guides, the second depression extending circumferentially around the axis radially inward relative to the second and the third guides.

18. The airbag assembly of claim 17, wherein the plurality of tubes are elongated radially relative to the axis.

\* \* \* \* \*